May 19, 1953
J. M. JACKSON
2,638,712
REMOTE CONTROL TOY VEHICLE
Filed Feb. 2, 1949
2 Sheets-Sheet 1
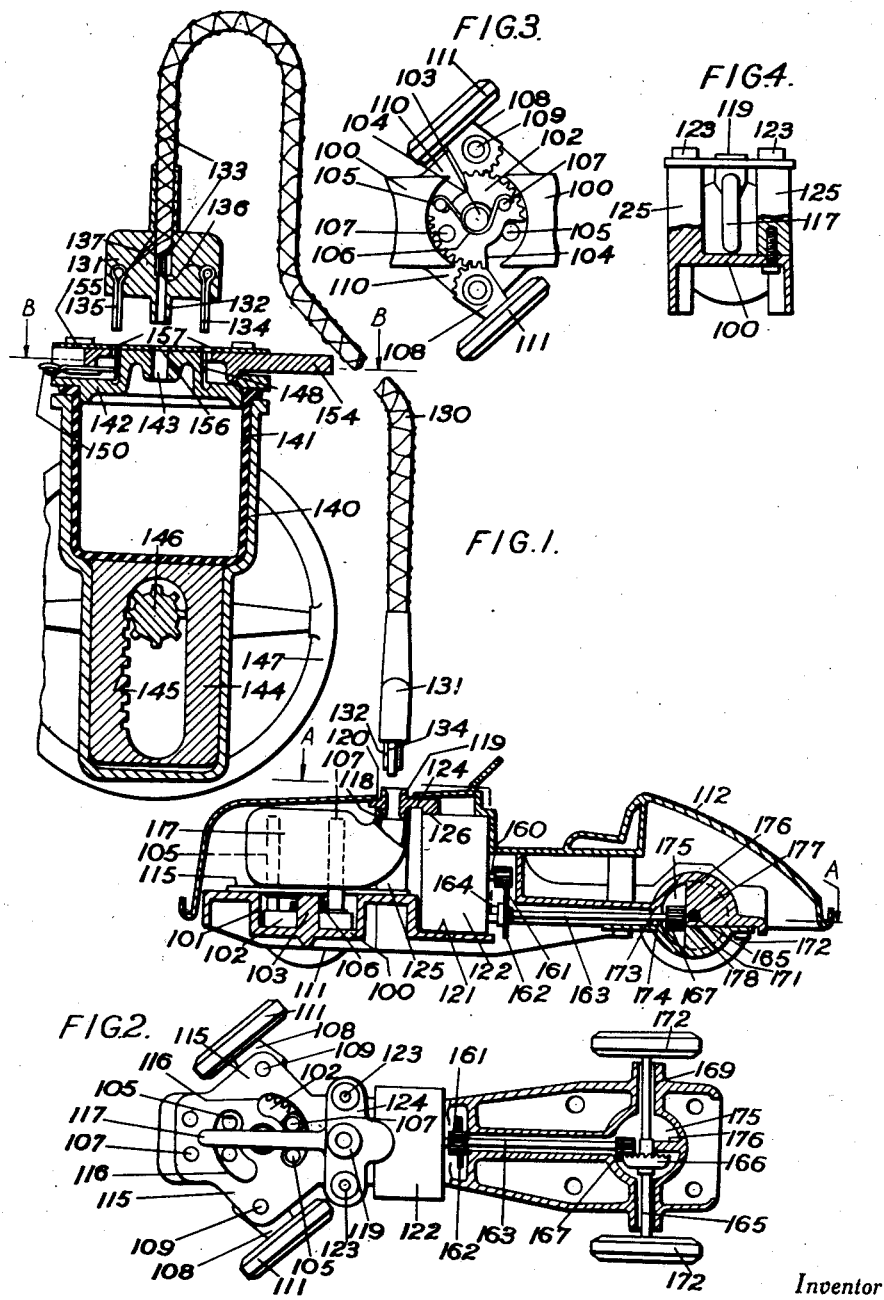
Inventor
John M. Jackson
By Emery, Holcombe & Blair
Attorneys

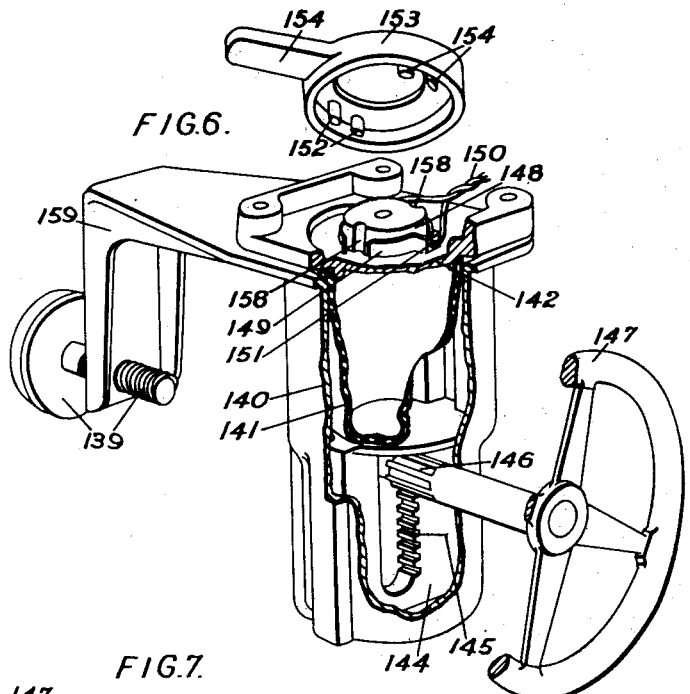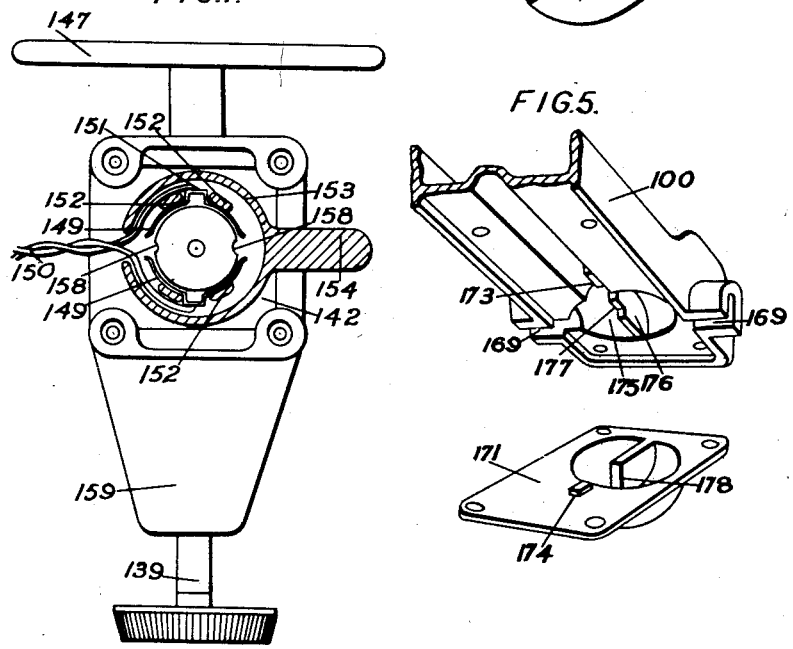

Patented May 19, 1953

2,638,712

UNITED STATES PATENT OFFICE 2,638,712

REMOTE CONTROL TOY VEHICLE

John Maxwell Jackson, Eastcote, England

Application February 2, 1949, Serial No. 74,217
In Great Britain February 4, 1948

10 Claims. (Cl. 46—210)

1

The present invention relates to steerable toy or model vehicles, such as road vehicles or ships, of the type in which the movement of the steerable wheels or rudder may be controlled from a remote point by air pressure, such as by a piston or collapsible bulb, which is connected through a flexible tube to air pressure actuated steering means on the vehicle.

An object of the invention is to provide a steerable toy or model vehicle of the above type which is propelled by an electric motor incorporated in the vehicle, the operation of which may be remotely controlled by a switch or the like whereby the starting, stopping, and if desired, the speed and reversing of the motor, may also be effected from the remote point.

A further object of the invention is to provide an improved steering mechanism for the vehicle which is of simple construction yet positive in action. Another object of the invention is to provide an improved remote control device which is of simple and compact construction and which enables the steering of the vehicle and the control of the motor to be easily effected. A still further object is to provide an improved connection between the remote control unit and the vehicle which incorporates the air line and electric conductors in a unitary structure.

These and other objects of the invention will be more clearly apparent from the following description, taken in conjunction with the accompanying drawings, which illustrate, by way of example, an embodiment of the invention, and in which:

Fig. 1 shows a view of an apparatus according to this invention comprising a toy car (shown in section from the side), a remote control device (shown in section), and the unitary flexible connection of which the end fittings are shown slightly separated from the complementary connections on the vehicle, and remote control device, the fitting adjacent the car being shown in side elevation and the other fitting being shown in section from the front.

Fig. 2 shows a plan view of the car shown in Fig. 1 with the body removed and the rear portion of the chassis sectioned along the line A—A in Fig. 1.

Fig. 3 is a fragmentary plan view of the steering mechanism with the plate 115 removed.

Fig. 4 is a fragmentary view, partly in section, of the bridge connector on the vehicle as seen from the front.

Fig. 5 is an exploded perspective view of the rear end of the chassis and the associated domed cover plate, the rear axle and propeller shaft having been omitted.

2

Fig. 6 is a perspective view, partly cut away, of the remote control device, with the switch actuating member raised from its normal position and the retaining cover plate omitted.

Fig. 7 is a section through the remote control device along the line B—B in Fig. 1.

Referring to the drawings; the motor car comprises a main chassis 100, which may conveniently be made as a moulding, for instance in a synthetic resinous material or alternately it may be made as a metal die casting. In the front end of the chassis 100 is a transverse recess 101 to accommodate the steering mechanism which consists of a toothed wheel 102, rotatable about a vertical pin 103 secured to or formed integrally with the chassis. The toothed edge of the wheel 102 is cut away over two arcs 104 to permit movement of the wheel 102 about the pin 103 within the limits imposed by two fixed abutment pins 105 carried by the chassis 100. Carried by the wheel 102 and at diametrically opposite points thereon are two crank pins 107 spaced from the pin 103 by substantially the same distance as separates the abutments 105 from the pin 103. The crank pins 107 form two movable abutments. The fixed and movable abutments 105, 107 are urged towards one another by the spring 106. The two toothed segments of the periphery of the wheel 102 engage respectively two toothed members 108, which are pivoted on pins 109 carried by lugs 110 formed on the chassis 100, and carry the steerable wheels 111 on stub axles projecting from the members 108. The wheel 102 and members 108 are so assembled that the wheels 111 are in a position corresponding to the maximum turning of the vehicle, in one direction, when the fixed and movable abutments 105, 107 are closest together as shown in the drawing.

The abutments 105 and 107 extend some distance above the wheel 102 through a cover plate 115 which is formed with two arcuate slots 116 to permit movement of the abutments 107 to rotate the wheel 102 about the pin 103. An inflatable bag 117 which is made of natural or synthetic rubber-like material and which, when deflated, is of a flat shape, lies between the pairs of abutments 105 and 107 and extends along the fore and aft axis of the car. The bag 117 is formed with a neck 118, the end of which connects with a socket 119 formed in a bridge piece 124 adapted to be secured by screws 123 to the top ends of two pillars 125 (of which at least one is made of insulating material) carried by the chassis 100. The socket 119 serves for the connection of a flexible tube, the opposite end of which is connected to means, located in the remote control device, for creating an air pressure, which pressure is transmitted through the flexible tube to inflate the bag 117, thereby moving the movable abutments 107 away from the fixed abutments 105 to turn the steerable wheels 111 to the desired position. When the air pressure is released, the spring 106 moves the abutments 107 and the toothed wheel 102 in the reverse direction.

The chassis 100 has a recess 121 to house a small electric motor 122 which may advantageously be of generally cylindrical shape and of the type in which the field is created by a permanent magnet. In the construction shown the motor 122 is of a type requiring only two electric connections and these are brought out from the motor to the screws 123 which are provided with axial bores to form electrical connector sockets.

The motor is retained in the recess 121 by the lug 126 on the bridge piece 124 bearing upon the top thereof when the bridge piece is secured in position.

The motor 122 has a shaft 160 carrying a pinion 161, which meshes with a gear wheel 162 carried by a propeller shaft 163, the rear end of which carries a pinion 167 meshing with a crown wheel 166 on the rear axle 165 carrying the driving wheels 172. The forward end of the propeller shaft 163 rotates in a bearing formed by a hole 164 in the casing of the motor 122, and the rear end of the propeller shaft rotates in a bearing formed by a channel 173 in the underside of the chassis and a retaining projection 174 on a domed cover plate 171 secured to the underside of the chassis by screws (not shown). The domed portion of this cover plate 171, together with a hemispherical recess 175 in the chassis, form a gear box in which the crown wheel 166 and pinion 167 are positioned. In the hemispherical portion 175 is fitted a segment of a disc 176 formed with a bearing portion 177 which engages the centre of the driving axle 165, the driving axle being held in position by another segment of a disc 178 fitted in the domed portion of the plate 171. The ends of the axle 165 extend through vertical guide slots 169 cut in the chassis portion of the vehicle. With the arrangement described, the rear axle can tilt about the central bearing 177 without the crown wheel 166 disengaging from the pinion 167. This is due to the fact that the crown wheel moves about an arc having its centre corresponding to the centre of the propeller shaft.

The chassis and associated mechanism described may be fitted with a body 112 of any desired design, the body having an aperture or apertures to allow the fitting 131 to be attached to the air and electrical sockets carried by the bridge piece 124.

The vehicle is connected to the remote control device through a unitary flexible connection comprising a flexible tube 133, made of rubber or like material through which the air pressure created in the remote control device is applied to the bag 117 in the vehicle, and two electrical conductors 136, 137 by which the electric current is fed to the electric motor 122. One of these conductors 136 passes through the bore of the tube 133, and the other conductor 137 is constituted by two or more wires braided around the external surface of the tube 133.

At each of its ends the assembly of the flexible tube and conductors is provided with a connector fitting 131 moulded from an insulating material. This fitting has a tubular spigot 132 in fluid connection with the tube 133 and a pair of contact pins 134, 135 electrically connected to the conductors 136, 137 respectively. The contact pins 134, 135 may conveniently be constructed from split pins to which the ends of the conductors are soldered, the fitting 131 being moulded around the end of the tube 133 and the split pins after the latter have been connected to the conductors. The tubular spigot 132 is adapted to fit tightly within the socket 119 on the vehicle and for this purpose the fitting is conveniently moulded of a resilient plastic material, such as polythene, and the spigot may be slightly tapered. The contact pins 134, 135 are spaced corresponding to the spacing between the sockets 123 and are so located with respect to the spigot 132 that, when the contacts 134, 135 are inserted into the sockets 123, the tubular spigot 132 engages within the socket 119.

An identical fitting 131 at the other end of the tube assembly is similarly detachably connected to the remote control device.

The remote control device shown in Figs. 6 and 7 consists of a casing 140 the upper end of which encloses a flexible rubber bag 141, the open end of which is closed by a plate 142 having a central hole or socket 143. Slidably mounted within the lower part of the casing 140 is a plunger 144 having an internal rack 145 which engages a pinion 146, carried by a shaft which can be turned by a steering wheel 147. The bag 141 and plate 142 form a compressible chamber which when the hand wheel 147 is turned, is compressed by the plunger 144 to force air through the air tube 133 to the bag 117 to steer the vehicle. The plunger 144 may, if necessary, be movable in guides or may be bonded to the flexible bag 141.

The plate 142 is formed with a central cylindrical part 148 surrounding the hole 143. A switch mechanism for controlling the starting, stopping and reversing of the electric motor 122 is mounted in a recess surrounding this part 148. The switch mechanism comprises two stirrup-shaped spring contacts 149 which are connected to supply leads 150 for connection to an external battery or other source of electric supply (not shown). The central portion of each spring 149 is bent as indicated at 151, the leads 150 being attached at this point. These parts 151 are each adapted to be engaged by two of the four lugs 152 formed on the under surface of a switch member 153 which has a handle 154 projecting to one side beyond the casing 140. The switch member 153 is held in position by a cover plate 155 of insulating material which is apertured centrally at 156 to give access to the socket 143 for the air connection and also provided with apertures 157 to receive the contact pins 134 on the fitting 131. When the fitting 131 is inserted in the remote control device with the contact pins 134 extending through apertures 157 and the spigot 132 tightly fitting the socket 143, the pins 134 lie in diametrically opposed recesses 158 in the part 148 and project into the path of the springs 149. When the switch member 153 lies in its central position, as shown in Fig. 7, the springs 149 are both out of contact with the contact pins 134. By turning the switch member 153 in one direction or the other, one of the springs 149 makes contact with one of the pins 134 and the other spring 149 makes contact with the other pin 134, the polarity of the connections depending upon the direction in which the switch member 153 is turned. In this way the polarity of the current supplied to the motor 122 can be reversed, and the switch member 153 therefore serves both for starting and stopping the motor 122, and also for reversing its direction of rotation.

The casing 140 may be provided with a clamping bracket 159 through which extends a clamping screw 139 by means of which the remote control device can be secured to a support, such for example as the back of a chair.

Whilst a particular embodiment has been described, it will be understood that various modifications may be made without departing from the scope of the invention as defined by the appended claims. For example, more than two conductors may be provided in the unitary flexible connection, either for controlling the operation of the motor or for controlling auxiliary devices on the vehicle such as a horn or lights. Furthermore, the remote control device may be constructed with a compartment adapted to accommodate the battery for supplying current to the motor. Moreover, although the invention has been described with reference to its application to a toy road vehicle, it will be clear that it is equally applicable to other toy vehicles, such as ships or aeroplanes, which are propelled by an electric motor and steered by fluid pressure actuated means.

I claim:

1. Apparatus comprising a model vehicle having wheels at least one of which is movable for steering the vehicle, an electric motor mounted on the vehicle and connected to drive at least one of said wheels, steering actuating means on the vehicle comprising a flexible bag adapted to be inflated by air pressure, said bag being positioned between a fixed abutment on the vehicle and a crank abutment constructed in the form of a crank pin carried by a toothed wheel or segment which is pivoted to the vehicle, the inflation of the bag causing the crank abutment to be moved away from the fixed abutment and thereby to turn the toothed wheel or segment, spring means for urging the crank abutment and fixed abutment towards one another, gear means for transmitting the movement of the toothed wheel or segment to the steerable wheel, air conduit means on the vehicle leading to said flexible bag, a pair of electrical connectors mounted on the vehicle and connected to said motor, a remote control device comprising a closed chamber, means for reducing the volume of said chamber to generate air pressure, an outlet connection from said chamber, an electric switch incorporated in said remote control device, and a pair of electrical connecting means associated with said switch, a flexible tube provided with connector fittings at each end for connecting with the air and electric connecting means on the vehicle and the remote control device respectively, and electrical conductors extending between the electrical connectors of the fittings at opposite ends of said flexible tube.

2. A steerable toy vehicle, wherein the steering actuating means comprises a wheel-like member having at least part of its periphery formed with teeth, said wheel-like member being mounted for part-rotary movement on the vehicle, a crank pin carried by said wheel-like member and displaced from the axis thereof, a fixed abutment on the vehicle adjacent said crank pin, a spring for urging said crank pin towards said fixed abutment, a flexible bag positioned between said crank pin and said fixed abutment and adapted to be inflated by air pressure, and a toothed member engaging with the peripheral teeth of the wheel-like member, said toothed member being connected to actuate the steering means of the vehicle.

3. Apparatus as claimed in claim 2, wherein the toothed wheel carries two crank pins at diametrically opposite positions, and wherein two fixed abutments are provided, the bag being positioned between the abutments and crank pins.

4. Apparatus as claimed in claim 3, wherein two diametrically opposite portions of the toothed wheel are cut away to permit the fixed abutments to be positioned on approximately the same circle as that on which the crank pins move when the toothed wheel turns.

5. Apparatus as claimed in claim 4, wherein a spring is provided to urge each pair of fixed and moving abutments close together, the flexible bag being of elongated form and being positioned to lie between the two pairs of abutments so that, when inflated, it moves the crank pins away from the associated fixed abutments against the action of the spring.

6. Apparatus as claimed in claim 5, wherein the toothed peripheral portions of the wheel are geared with teeth formed on members arranged at each side of the vehicle and movable about vertical pins, each of the said members carrying one of the steerable wheels.

7. In combination, a remote control device comprising an air chamber, means for reducing the volume of said chamber to generate air pressure, an outlet from said chamber, socket means positioned around said outlet and adapted to receive electrical contact pins, a flexible tube provided at its end with a connector fitting provided with means for connecting the flexible tube to said outlet and with electrical contact pins adapted to enter said socket means when the fitting is connected to said outlet, a member rotatable around said outlet, electric contacts carried by said member and adapted to engage with and disengage from the electrical contact pins of said fitting, when arranged in said socket means, in dependence upon the position of said rotatable member.

8. Apparatus as claimed in claim 7, wherein the air chamber comprises a flexible bag, a ram member for compressing said bag, and a rotatable member for actuating said ram.

9. Apparatus as claimed in claim 7, wherein the outlet from the air chamber is formed in a cylindrical member of such dimensions that the contact pins on the fitting lie in grooves formed on the peripheral surface of the cylindrical member, when the fitting is connected to the remote control device, the switch comprising contacts movable around said cylindrical member to engage with the contact pins lying around the surface thereof.

10. Apparatus as claimed in claim 9, wherein two stirrup-shaped contacts are provided which are adapted to be respectively connected to the two poles of the electric supply source, said stirrup contacts being disposed in substantially diametrically opposite positions with respect to the cylindrical member and being actuated by a handle rotatable about the axis of said cylindrical portion whereby, when the handle is moved to a limiting position in one direction the stirrup contacts engage with the two contact pins and when the handle is moved to its other limiting position the stirrup contacts are reversely connected to the contact pins, the stirrup contacts